United States Patent
Kimiabeigi

(10) Patent No.: US 8,604,657 B2
(45) Date of Patent: Dec. 10, 2013

(54) YOKE FOR A PERMANENT MAGNET MACHINE

(75) Inventor: Mohammad Kimiabeigi, Sheffield (GB)

(73) Assignee: Siemens Aktiengesellschaft, München (DE)

( * ) Notice: Subject to any disclaimer, the term of this patent is extended or adjusted under 35 U.S.C. 154(b) by 21 days.

(21) Appl. No.: 13/313,052

(22) Filed: Dec. 7, 2011

(65) Prior Publication Data

US 2012/0153760 A1  Jun. 21, 2012

(30) Foreign Application Priority Data

Dec. 20, 2010  (EP) .................................... 10195997

(51) Int. Cl.
*H02K 1/17*  (2006.01)

(52) U.S. Cl.
USPC ............. 310/154.08; 310/154.34; 310/156.12

(58) Field of Classification Search
USPC ............ 310/154.08, 154.09, 154.34, 154.48, 310/156.49, 156.02, 156.12–156.15, 12.24, 310/12.26, 181, 49.28, 49.36, 49.46, 49.53
See application file for complete search history.

(56) References Cited

U.S. PATENT DOCUMENTS

| | | | | |
|---|---|---|---|---|
| 4,625,392 A * | 12/1986 | Stokes | | 29/598 |
| 4,633,113 A | 12/1986 | Patel | | |
| 4,745,312 A * | 5/1988 | Nagasaka | | 310/49.55 |
| 4,746,827 A * | 5/1988 | Ochiai et al. | | 310/156.22 |
| 4,801,834 A * | 1/1989 | Stokes | | 310/156.12 |
| 6,831,387 B2 * | 12/2004 | Kondo et al. | | 310/154.03 |
| 2002/0079770 A1 | 6/2002 | Ann-Huang | | |
| 2005/0118044 A1 | 6/2005 | Inoue et al. | | |

FOREIGN PATENT DOCUMENTS

| | | |
|---|---|---|
| DE | 4010569 A1 | 8/1991 |
| DE | 4107602 A1 | 9/1992 |
| JP | 2001069700 A | 3/2001 |

* cited by examiner

*Primary Examiner* — Dang Le

(57) ABSTRACT

A yoke for a permanent magnet machine shows a surface with an accommodation area for accommodating a permanent magnet, wherein two recesses are provided adjacent to the accommodation area to increase reluctance.

14 Claims, 2 Drawing Sheets

YOKE FOR A PERMANENT MAGNET MACHINE

CROSS REFERENCE TO RELATED APPLICATIONS

This application claims priority of European Patent Office Application No. 10195997.1 EP filed Dec. 20, 2010. All of the applications are incorporated by reference herein in their entirety.

FIELD OF INVENTION

The claimed invention relates to a permanent magnet machine like e.g. a generator. In particular, the claimed invention is directed to a yoke, a rotor and a stator for a permanent magnet machine and a permanent magnet machine.

BACKGROUND OF INVENTION

Generators generally have a moving rotor and a stationary stator to generate electrical energy. Either the rotor or the stator comprises a yoke with a permanent magnet. The other part comprises laminations with windings.

Magnet flux is an important parameter of a generator as it contributes to the torque of the generator. Leakages of magnet flux occur during operation of the permanent magnet machine and reduce the torque.

In the end regions of the generator i.e. at the axial ends of the generator magnet flux leakage occurs. It was realized to be significant especially for a direct drive generator in which high magnetic loading of the stator laminations is desired for high ratio of output power to weight. Due to high magnetic loading, the stator ferromagnetic material is magnetically saturated and this results in high value of flux leakage in the end regions of the permanent magnet where it is easier for the flux lines to close their path through the rotor and avoid linking the stator windings and thereby their contribution to torque decreases by getting closer to the end regions. Furthermore, in direct drive generators with large diameters and short axial length the ratio of the magnet flux leaking to the portion of the magnet flux that links the stator winding and contributes to the torque becomes more significant.

The situation described above does not apply solely to outer rotor direct drive generators but to all other types of permanent magnet machines as well. However, this situation is of importance especially for outer rotor direct drive generators.

In the literature it is proposed to shorten the length of the rotor compared to the stator. However, this method is only practical for inner rotor generators or motors where the rotor yoke underlying the magnets ends where the magnet ends, seen in an axial direction. However, external rotor generators are preferred to inner rotor generators due to their higher output power to weight ratio.

SUMMARY OF INVENTION

It is an object of the claimed invention to decrease the magnet flux leaking of a permanent magnet machine.

This object is solved by a yoke, a rotor and a stator of an electric machine as claimed in the claims.

A yoke for a permanent magnet machine comprises a surface with an accommodation area for accommodating a permanent magnet, wherein two recesses are provided adjacent to the accommodation area to increase the reluctance. The idea is to maximize the main to leakage flux ratio by increasing the reluctance of the leakage flux path to minimize the magnet flux leaking. The reluctance is increased as air is arranged close to the ends of the permanent magnet instead of the ferromagnetic yoke. The aforementioned ratio between the useful flux and the leakage flux is maximized and thereby the output power for the same magnet volume and cost is improved depending on the magnet thickness, axial length and diameter of the generator air gap. The improvement in output power lies in the order by up to 10% more precisely by roughly 1-3 percent. A further advantage is the reduction of weight of the yoke. The recesses can be obtained by removing these parts by machining.

A width and/or a depth of the recesses may correspond substantially to a thickness of the permanent magnet. This dimension offers already a good reduction of magnet flux leakage. In a further optimization FE (Finite Elements) computation can be utilized to optimize the form of the recesses.

The recesses may extend to the ends of the surface. Now, the width of the recesses reaches from the accommodation area to the rims of the yoke so that the surface has only the size of the accommodation area. While this solution affects the mechanical design significantly it offers a good reduction of magnet flux leakage paired with a significant weight reduction.

A side wall of the recess adjacent to the accommodation area may extend at an angle. According to this more effective approach, i.e. to increase the reluctance path of the leakage flux even higher, the yoke might be removed along a sloped line, rather than a vertical line, wherein the angle of the sloped side wall can be chosen to form an undercut.

Non magnetic material, in particular non magnetic material which magnetically behaves like air but is mechanically strong like, e.g., stainless steel, may be provided in the recesses, e.g. by welding, in order to increase the mechanical strength of the rotor yoke while still keeping the reluctance high and thereby the leakage flux low.

The surface may be a peripheral surface and the two recesses may be arranged adjacent to the accommodation area in an axial direction. This design corresponds to the common permanent magnet machine.

In a further aspect, a rotor for a permanent magnet machine comprises a permanent magnet and a yoke as described above. The same advantages and modifications as described above apply here as well. For outer rotor direct drive generators which are becoming more common and are often used in large applications like wind turbines the claimed invention is especially beneficial as they have a high magnetic loading of the stator laminations and a large weight.

The rotor may comprise a base plate arranged between the accommodation area and the permanent magnet. Such a ferromagnetic base plate can be ignored in the modification and only the rotor yoke is modified as described before. Or the side walls of base plate may extend at an angle and may be modified as well to have a sloped side wall in the two end faces, where the sides may be aligned with the slope made in the rotor yoke.

In a further aspect, a stator for a permanent magnet machine comprises a permanent magnet and a yoke as described above. The same advantages and modifications as described above apply here as well.

The stator may comprise a base plate arranged between the accommodation area and the permanent magnet. Such a ferromagnetic base plate can be ignored in the modification and only the stator yoke is modified as described before. Or the side walls of base plate may extend at an angle and may be modified as well to have a sloped side wall in the two end faces, where the sides may be aligned with the slope made in the stator yoke.

In an even further aspect, a permanent magnet machine comprises a stator, a rotor and a yoke as described above. The same advantages and modifications as described above apply here as well. The claimed invention is most beneficial for outer rotor direct drive generators. The permanent magnet machine may comprise a rotor or a stator as described above.

The accompanying drawings are included to provide a further understanding of embodiments. Other embodiments and many of the intended advantages will be readily appreciated as they become better understood by reference to the following detailed description. The elements of the drawings do not necessarily scale to each other. Like reference numbers designate corresponding similar parts.

DETAILED DESCRIPTION OF INVENTION

In the following detailed description, reference is made to the accompanying drawings which form a part hereof and in which are shown by way of illustration specific embodiments in which the claimed invention may be practised. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the claimed invention. The following detailed description, therefore, is not to be taken in a limiting sense, and the scope of the claimed invention is defined by the appended claims.

Figure 1:
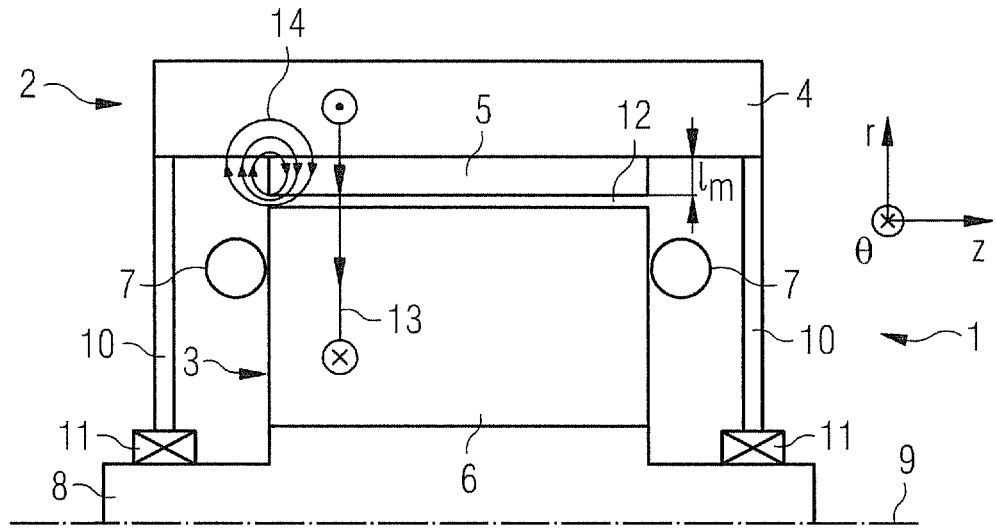
FIG. 1 illustrates a schematic cross-sectional view of a permanent magnet machine.

FIG. 1 shows the permanent magnet machine 1 is in this exemplary case an outer rotor direct drive generator. The permanent magnet machine 1 has a rotor 2 and a stator 3. The rotor 2 comprises a yoke 4 which is carrying a permanent magnet 5. The stator 3 comprises a lamination pack 6 with windings. End windings 7 of the windings are depicted. The stator 3 is attached to a shaft 8 of the permanent magnet machine 1. The shaft 8 rotates about an axis of rotation 9. The rotor 2 is supported by vertical arms 10 which are each connected to a bearing 11. Between the rotating permanent magnet 5 and the stationary lamination pack 6 is a small air gap 12 of the permanent magnet machine 1.

A cylindrical coordinate system is depicted with an axial (z), radial (r) and tangential direction (θ).

Arrows show the direction of main flux 13 which contributes to the output torque of the permanent magnet machine 1. Out from the yoke 4 and through the permanent magnet 5 the main flux 13 passes through the air gap 12 and stator lamination pack 6. Then the main flux 13 continues its path by changing direction and going inwardly into the stator lamination pack 6 and alter coming back through the other pole in stator 3, air gap 12 and finally the rotor 2. It closes the cycle by re entering the initial magnet pole.

In general, a weak point of the machine design from a three dimensional aspect is seen in the axial end regions, especially of the permanent magnet 5. Leakage flux 14 leaks from the permanent magnet 5 into the rotor yoke 2 and back to the permanent magnet 5.

FIGS. 2 to 7 show the approach to reduce the leakage flux 14. First, the theoretical background is discussed.

The dependency of the main flux 13 and the leakage flux 14 on the permanent magnet 5 and other design parameters can be analytically described by the following equations 1 and 2 (main flux is the flux which contributes to torque).

$$B_{main} \propto \frac{H_m l_m}{(\delta_{gap} + \delta_{saturation})} \quad (1)$$

$$B_{leak} \propto \frac{H_m l_m}{(l_m + w_r + h_r)} \quad (2)$$

where $$\delta_{SATURATION} \propto \frac{H_m l_m}{(\delta_{gap} + w_{tooth})} \quad (3)$$

is the fictitious extra length of the air gap 12 due to the magnetic saturation of the stator 3;
$B_{main}$ indicates the main flux;
$B_{leakage}$ indicates the leakage flux;
$H_m$ indicates the magnetic field strength of the permanent magnet 5;
$W_{tooth}$ indicates the width of one stator tooth in tangential direction;
$l_m$ indicates the radial thickness of the permanent magnet 5;
$h_r$ indicates the radial height of the proposed recess 17 made in the rotor yoke (2);
$w_r$ indicates the axial width of the proposed recess 17 made in the rotor yoke (2);
$\alpha_r$ indicates the angle which indicates the slope for one of the side walls of the recess 17 in the rotor yoke 4;
$\delta_{gap}$ indicates the radial length of the air gap 12.

Equation 4 describes the proportion between the main flux and the leakage flux:

$$\left(\frac{B_{main}}{B_{leak}}\right)\uparrow = \frac{l_m + w_r\uparrow + h_r\uparrow}{\delta_{gap} + \delta_{saturation}} \quad (4)$$

The idea is to maximize the main to leakage flux ratio by increasing the reluctance of the leakage flux path. It is proposed here to remove parts of the yoke 4 to increase the reluctance. The reluctance is thereby increased as magnetic material of the yoke 4 is removed and replaced by air having a higher reluctance. To increase the mechanical strength of the rotor yoke 4 while still keeping the reluctance high and thereby the leakage flux low stainless steel, or other mechanically strong non magnetic material that magnetically behaves like air, can be arranged where the original material has been removed.

Here, two recesses 17 are arranged in the yoke 4 which have a width $w_r$ and a height $h_r$ in axial and radial directions respectively. As is seen from equation 4 the main to leakage flux ration increases with increasing width $w_r$ and increasing height $h_r$ of the recesses 17.

Note that from a mechanical design perspective, the proposed modification might only have a minor influence due to the fact that only a small fraction of rotor yoke 4 is removed for example by machining.

The choice of the alternatives will be based an fine tuned magnetic design by using numerical tools like FE and simplicity of manufacturing.

Figure 2:
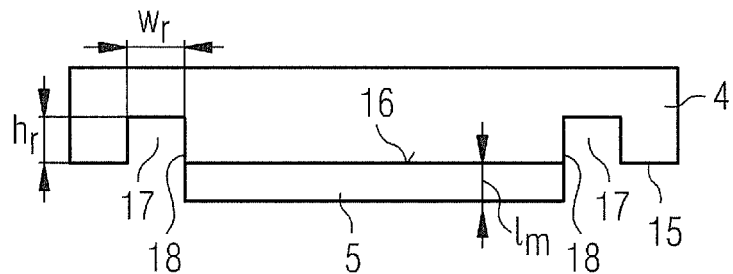
FIG. 2 illustrates a schematic view of a rotor yoke.

FIG. 2 shows the rotor yoke 4 having an inner peripheral surface 15. Part of this surface 15 forms an accommodation area 16 for accommodating the permanent magnet 5. Left and right of the accommodation area 16 as seen in axial direction z are two recesses 17 arranged. Each recess 17 has a width $w_r$ and a height $h_r$ or depth which correspond roughly to the thickness $l_m$ of the permanent magnet 5.

The recesses 17 are adjacent to the accommodation area 16 and also to the permanent magnet 5. This design encompasses the case as shown in FIG. 2 where an inner side wall 18 of the recess 17 directly neighbours to the accommodation area 16. It is also encompassed that a distance is between the axial end of the accommodation area 16 and the inner side wall 18.

As the reluctance of the recess 17 is higher than the ferromagnetic material of the yoke 4 the leakage flux in the end regions is significantly reduced.

Figure 3:
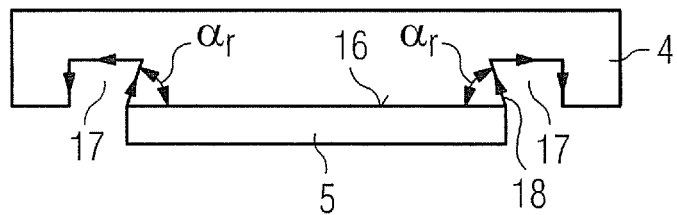
FIG. 3 illustrates a schematic view of a further rotor yoke.

FIG. 3 shows a further implementation of the yoke 4 with the two recesses 17. Here, the inner side walls 18 are sloped. The inner side walls 18 are arranged at an angle $\alpha_r$, measured between the accommodation area 16 and the inner side wall 18. The angle $\alpha_r$ is smaller than 90°. The inner side wall 18 forms an undercut. This shape of the recess or cavity 17 increases the reluctance of the leakage flux path further as more ferromagnetic material of the yoke 4 along the leakage flux path is replaced by air.

Figure 4:
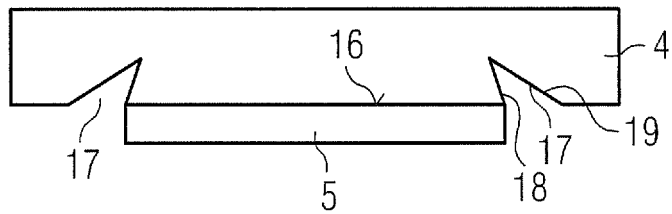
FIG. 4 illustrates a schematic view of another rotor yoke.

FIG. 4 shows another implementation of the yoke 4 with the two recesses 17. The inner side wall 18 of the recess 17 runs in vertical direction while an outer side wall 19 is sloped. The leakage flux 14 flows in a circular fashion as seen in FIG. 1. Therefore, is the flux in the area of the outer side wall 19 smaller than at the inner side wall 18. This leads to the shape of the recess 17 where material of the yoke 4 is removed along the more relevant inner side wall 18 and only removed partially at the outer side wall 19.

Figure 5:
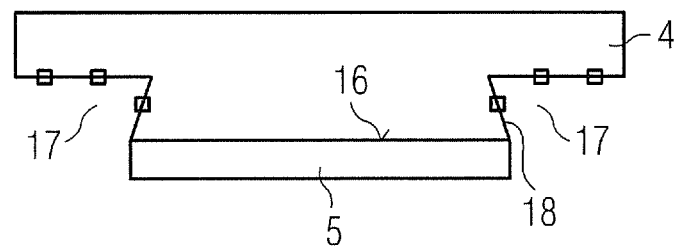
FIG. 5 illustrates a schematic view of yet another rotor yoke.

FIG. 5 depicts an implementation of the yoke 4 where the recesses 17 stretch from the accommodation area 16 to the axial ends of the yoke 4. Here, a lot more material of the yoke 4 is removed e.g. by machining as compared to the previous Figures. This shape of the yoke 4 or the recesses 17 might be easier to manufacture as the recess 17 has two open sides. A further advantage is a significant reduction in weight of the yoke 4. As a huge amount of ferromagnetic material of the yoke 4 is removed the reluctance of the leakage flux path is increased.

The inner side wall of the recess 17 is again sloped. It is of course also possible to have a vertical inner side wall 18.

Figure 6:
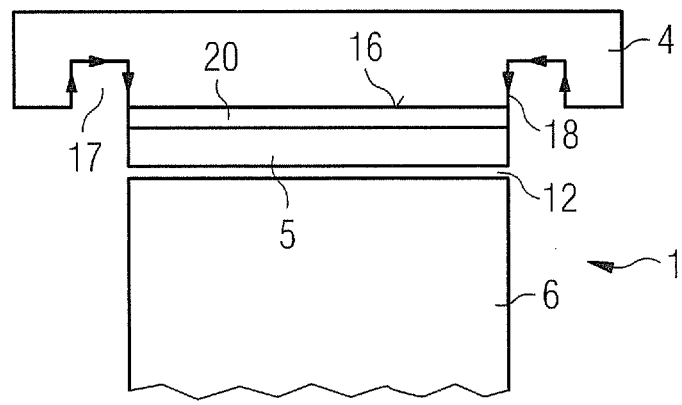
FIG. 6 illustrates a schematic view of a permanent magnet machine with rotor yoke.

FIG. 6 shows a further implementation of the permanent magnet machine 1. The permanent magnet machine 1 has a yoke 4 as shown in FIG. 2. A yoke 4 as shown in FIGS. 3 to 5 can alternatively be employed. The permanent magnet 5 is not directly attached to the accommodation area 16. Here, a ferromagnetic base plate 20 is arranged at the accommodation area 16 and carries the permanent magnet 5. The lamination pack 6 of the stator 3 is separated by the air gap 12 from the permanent magnet 5. The ferromagnetic base plate 20 can be used to ease the handling and mounting of the permanent magnet 5.

In FIG. 6, the inner side wall 18 of the recess 17 and a side wall of the base plate 20 are vertical. Even if the inner side wall 18 of the recess 17 is sloped the side wall of the base plate 20 may extend in vertical direction.

Figure 7:
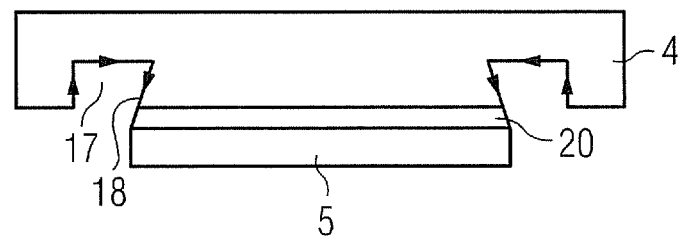
FIG. 7 illustrates a schematic view of a rotor yoke with a base plate.

FIG. 7 shows a yoke 4 with base plate 20 and permanent magnet 5 where the inner side walls 18 of the recesses 17 are sloped. Now, the side walls of the base plate 20 are sloped as well. Preferably, the sloping angle of the inner side wall 18 and the side wall of the base plate 20 are identical or roughly the same.

A combination of embodiments and details as shown in FIGS. 2 to 7 falls into the scope of the claimed invention. For example, the embodiments shown in FIG. 3 and FIG. 4 can be combined. This will lead to a yoke 4 having recesses 17 with two sloped side walls. The sloping angles of the inner side wall 18 and the outer side wall 19 may be the same or roughly the same.

In case, where only part of the permanent magnet machine 1 or a generator is described like for example in FIG. 2 it is self-evident that this description applies also to a complete permanent magnet machine or part of it like a rotor or stator.

The claimed invention has been described for a permanent magnet machine 1 with an outer rotor 2. It is clear that the claimed invention can also be utilized with a permanent magnet machine with inner rotor and outer stator.

The invention claimed is:

1. Yoke for a permanent magnet machine, comprising:
   a surface with an accommodation area for accommodating a permanent magnet, and
   two recesses provided adjacent to the accommodation area,
   wherein the two recesses are adjacent to the accommodation area,
   wherein each of the two recesses comprises an inner side wall which is directly adjacent to the accommodation area,
   wherein the inner side walls each are arranged at an angle, which is measured between the accommodation area and the inner side wall, to increase a reluctance,
   wherein the angle is smaller than 90° such that the inner side wall forms an undercut, and
   wherein a width and/or a depth of the recesses corresponds substantially to a thickness of the permanent magnet.

2. Yoke according to claim 1, wherein the recesses extend to the ends of the surface.

3. Yoke according to claim 1, wherein non magnetic material is provided inside the recesses.

4. Yoke according to claim 1, wherein the surface is a peripheral surface, and wherein the two recesses are arranged adjacent to the accommodation area in an axial direction.

5. Rotor of a permanent magnet machine, comprising:
   a permanent magnet, and
   a yoke, the yoke comprising:
     a surface with an accommodation area for accommodating a permanent magnet, and
     two recesses provided adjacent to the accommodation area,
     wherein the two recesses are adjacent to the accommodation area,
     wherein each of the two recesses comprises an inner side wall which is directly adjacent to the accommodation area,
     wherein the inner side walls each are arranged at an angle, which is measured between the accommodation area and the inner side wall, to increase a reluctance,
     wherein the angle is smaller than 90° such that the inner side wall forms an undercut, and wherein a width and/or a depth of the recesses corresponds substantially to a thickness of the permanent magnet.

6. Rotor according to claim 5, further comprising:
a base plate arranged between the accommodation area and the permanent magnet.

7. Rotor according to claim 6, wherein side walls of the base plate extend at an angle.

8. Rotor according to claim 5, wherein non magnetic material is provided inside the recesses.

9. Rotor according to claim 5, wherein the surface is a peripheral surface, and wherein the two recesses are arranged adjacent to the accommodation area in an axial direction.

10. Stator for a permanent magnet machine, comprising:
a permanent magnet, and
a yoke, the yoke comprising:
    a surface with an accommodation area for accommodating a permanent magnet, and
    two recesses provided adjacent to the accommodation area,
    wherein the two recesses are adjacent to the accommodation area,
    wherein each of the two recesses comprises an inner side wall which is directly adjacent to the accommodation area,
    wherein the inner side walls each are arranged at an angle, which is measured between the accommodation area and the inner side wall, to increase a reluctance,
    wherein the angle is smaller than 90° such that the inner side wall forms an undercut, and
    wherein a width and/or a depth of the recesses corresponds substantially to a thickness of the permanent magnet.

11. Stator according to claim 10, further comprising:
a base plate arranged between the accommodation area and the permanent magnet.

12. Stator according to claim 11, wherein side walls of the base plate extend at an angle.

13. Stator according to claim 10, wherein non magnetic material is provided inside the recesses.

14. Stator according to claim 10, wherein the surface is a peripheral surface, and wherein the two recesses are arranged adjacent to the accommodation area in an axial direction.

* * * * *